United States Patent
Dang et al.

(10) Patent No.: US 12,481,074 B2
(45) Date of Patent: Nov. 25, 2025

(54) MOTION-BASED CALIBRATION OF AN AERIAL DEVICE

(71) Applicant: Skydio, Inc., San Mateo, CA (US)

(72) Inventors: Anh Tung Dang, Redwood City, CA (US); Peter Benjamin Henry, San Francisco, CA (US); Hayk Martirosyan, San Francisco, CA (US); Kristen Marie Holtz, Menlo Park, CA (US); Dominic William Pattison, Cupertino, CA (US)

(73) Assignee: Skydio, Inc., San Mateo, CA (US)

( * ) Notice: Subject to any disclaimer, the term of this patent is extended or adjusted under 35 U.S.C. 154(b) by 413 days.

(21) Appl. No.: 17/875,850

(22) Filed: Jul. 28, 2022

(65) Prior Publication Data
US 2023/0296793 A1 Sep. 21, 2023

Related U.S. Application Data

(60) Provisional application No. 63/321,217, filed on Mar. 18, 2022.

(51) Int. Cl.
*G01S 19/47* (2010.01)
*G01C 21/16* (2006.01)
*G01S 19/42* (2010.01)

(52) U.S. Cl.
CPC .......... *G01S 19/47* (2013.01); *G01C 21/1654* (2020.08); *G01S 19/421* (2013.01)

(58) Field of Classification Search
CPC ... G01S 19/47; G01S 19/421; G01C 21/1654; G01C 25/005
See application file for complete search history.

(56) References Cited

U.S. PATENT DOCUMENTS

| | | | | |
|---|---|---|---|---|
| 7,796,675 B1 * | 9/2010 | Carter | .................. | G08B 25/007 375/147 |
| 8,005,635 B2 * | 8/2011 | Lin | ....................... | G01C 25/005 701/472 |
| 11,747,830 B2 * | 9/2023 | Burghardt | .............. | G01C 21/16 701/4 |
| 2011/0210872 A1 * | 9/2011 | Molander | ................. | G01S 5/16 340/961 |

(Continued)

FOREIGN PATENT DOCUMENTS

| CN | 102692225 B | * | 3/2015 | |
|---|---|---|---|---|
| CN | 112013873 A | * | 12/2020 | ........... G01C 25/005 |

OTHER PUBLICATIONS

International Search Report and Written Opinion mailed on Sep. 5, 2023 in corresponding PCT Application No. PCT/US2023/064358.

*Primary Examiner* — Marcus E Windrich
(74) *Attorney, Agent, or Firm* — Young Basile Hanlon & MacFarlane, P.C.

(57) ABSTRACT

A calibration of an unmanned aerial vehicle is performed without the use of a magnetometer. The unmanned aerial vehicle generates a first acceleration vector in a navigation frame of reference and a second acceleration vector in a GPS frame of reference. The unmanned aerial vehicle estimates a heading of the unmanned aerial vehicle based on the first acceleration vector and the second acceleration vector. The unmanned aerial vehicle performs a calibration based on the estimated heading of the unmanned aerial vehicle.

20 Claims, 15 Drawing Sheets

(56) References Cited

U.S. PATENT DOCUMENTS

| | | | |
|---|---|---|---|
| 2012/0016538 A1* | 1/2012 | Waite | G01B 7/00 |
| | | | 701/3 |
| 2012/0253585 A1* | 10/2012 | Harvie | G07C 5/085 |
| | | | 701/32.5 |
| 2018/0112980 A1* | 4/2018 | Diem | B64U 10/14 |
| 2018/0188032 A1* | 7/2018 | Ramanandan | G01S 19/52 |
| 2019/0242711 A1* | 8/2019 | Ingersoll | G01C 21/1652 |
| 2019/0323839 A1* | 10/2019 | Gurdan | G01C 17/28 |
| 2019/0390976 A1* | 12/2019 | Anderson | G06F 3/013 |
| 2020/0073385 A1* | 3/2020 | Jobanputra | G06N 20/00 |
| 2020/0109965 A1* | 4/2020 | Kuriakose | B64D 43/00 |
| 2021/0124033 A1* | 4/2021 | Ziegler | G01S 13/931 |
| 2021/0225182 A1* | 7/2021 | Wyrobek | G08G 5/0039 |
| 2021/0263162 A1 | 8/2021 | Villien | |
| 2022/0196852 A1* | 6/2022 | Reimer | G01S 19/49 |
| 2024/0418792 A1* | 12/2024 | Lubecki | G01R 19/02 |
| 2024/0421595 A1* | 12/2024 | Lubecki | H03K 17/302 |
| 2025/0124296 A1* | 4/2025 | Guo | G06N 3/045 |

* cited by examiner

MOTION-BASED CALIBRATION OF AN AERIAL DEVICE

CROSS REFERENCE TO RELATED APPLICATION(S)

This application claims priority to and the benefit of U.S. Provisional Patent Application Ser. No. 63/321,217, filed Mar. 18, 2022, the entire disclosure of which is hereby incorporated by reference.

TECHNICAL FIELD

This disclosure relates to aerial vehicle calibration.

BACKGROUND

Unmanned aerial vehicles (UAVs) typically require periodic calibration of one or more sensors. One of these sensors is a magnetometer of the UAV. The calibration procedure of the magnetometer is time consuming, and in many cases, the resulting magnetometer calibration is unreliable.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
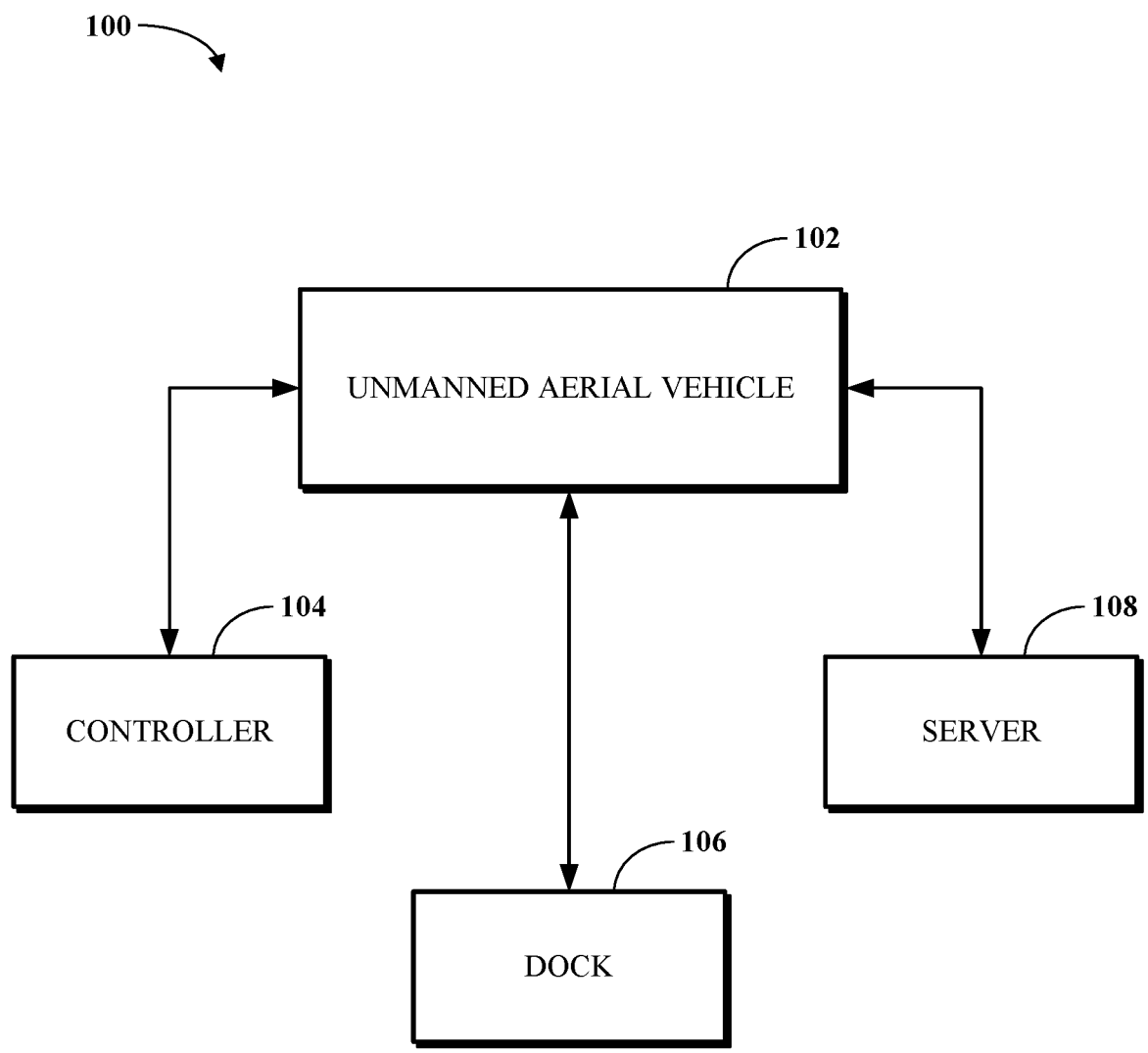
FIG. 1 is an illustration of an example of a UAV system.

Autonomous navigation functions of a UAV conventionally rely upon various onboard sensors, which generate data based on the UAV and/or the environment in which the UAV is operating. The data is generally processed at the UAV to determine one or more aspects of functionality for the UAV, including, for example, how and where the UAV will be flown, whether to capture images and what to focus those images on, whether to follow a subject or a defined flight path, or the like. This processing typically accounts for various environmental and UAV constraints, such as locations of obstacles (e.g., objects) within the environment in which the UAV is operating, indications of whether those obstacles are stationary or mobile, speed capabilities of the UAV, and other external factors which operate against the UAV in-flight.

One or more navigation sensors of the UAV must be calibrated to generate an accurate heading of the UAV. One common sensor used for UAV navigation is a magnetometer on the UAV. Conventional UAV magnetometers require periodic calibration. Calibrating a magnetometer can be time consuming, however. Furthermore, it may be difficult to know whether the magnetometer calibration is valid at a given time. Since magnetometer calibration relies on the magnetic field of the earth, the magnetometer is susceptible to magnetic interference, for example, from nearby metal objects, the UAV itself, metal in the environment, or any combination thereof. In addition, the magnetometer could be affected by spinning motors, making it difficult to use in-flight. As such, conventional UAV magnetometers suffer from drawbacks rendering them unreliable.

Implementations of this disclosure address problems such as these using a calibration method that does not rely on the magnetometer. A UAV as disclosed herein is configured for a motion-based calibration that can be performed without the use of the magnetometer. The UAV is configured to compute an inertial measurement unit (IMU) vector associated with a UAV direction and a global positioning system (GPS) vector associated with a GPS orientation and calibrate the UAV based on a correlation of the UAV direction with the GPS orientation. Some implementations are described herein as being performed via a UAV or being implemented at a flight control subsystem onboard a UAV. However, alternative implementations may be performed at an aerial vehicle that is not a UAV and/or may be implemented remotely at a user device or a server that communicates with the UAV.

Some implementations disclosed herein include various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality. However, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

To describe some implementations in greater detail, reference is first made to examples of hardware and software structures used to implement motion-based calibration for a UAV. FIG. 1 is an illustration of an example of a UAV system 100. The system 100 includes a UAV 102, a controller 104, a dock 106, and a server 108.

The UAV 102 is a vehicle which may be controlled autonomously by one or more onboard processing aspects or remotely controlled by an operator, for example, using the controller 104. The UAV 102 may be implemented as one of a number of types of unmanned vehicle configured for aerial operation. For example, the UAV 102 may be a vehicle commonly referred to as a drone, but may otherwise be an aircraft configured for flight within a human operator present therein. In particular, the UAV 102 may be a multi-rotor vehicle. For example, the UAV 102 may be lifted and propelled by four fixed-pitch rotors in which positional adjustments in-flight may be achieved by varying the angular velocity of each of those rotors.

The controller 104 is a device configured to control at least some operations associated with the UAV 102. The controller 104 may communicate with the UAV 102 via a wireless communications link (e.g., via a Wi-Fi network, a Bluetooth link, a ZigBee link, or another network or link) to receive video or images and/or to issue commands (e.g., take off, land, follow, manual controls, and/or commands related to conducting an autonomous or semi-autonomous navigation of the UAV 102). The controller 104 may be or include a specialized device. Alternatively, the controller 104 may be or includes a mobile device, for example, a smartphone, tablet, laptop, or other device capable of running software configured to communicate with and at least partially control the UAV 102.

The dock 106 is a structure which may be used for takeoff and/or landing operations of the UAV 102. In particular, the dock 106 may include one or more fiducials usable by the UAV 102 for autonomous takeoff and landing operations. For example, the fiducials may generally include markings which may be detected using one or more sensors of the UAV 102 to guide the UAV 102 from or to a specific position on or in the dock 106. In some implementations, the dock 106 may further include components for charging a battery of the UAV 102 while the UAV 102 is on or in the dock 106. The dock 106 may be a protective enclosure from which the UAV 102 is launched. A location of the dock 106 may correspond to the launch point of the UAV 102.

The server 108 is a remote computing device from which information usable for operation of the UAV 102 may be received and/or to which information obtained at the UAV 102 may be transmitted. For example, the server 108 may be used to train a learning model usable by one or more aspects of the UAV 102 to implement functionality of the UAV 102. In another example, signals including information usable for updating aspects of the UAV 102 may be received from the server 108. The server 108 may communicate with the UAV 102 over a network, for example, the Internet, a local area network, a wide area network, or another public or private network.

In some implementations, the system 100 may include one or more additional components not shown in FIG. 1. In some implementations, one or more components shown in FIG. 1 may be omitted from the system 100, for example, the server 108.

Figure 2A:
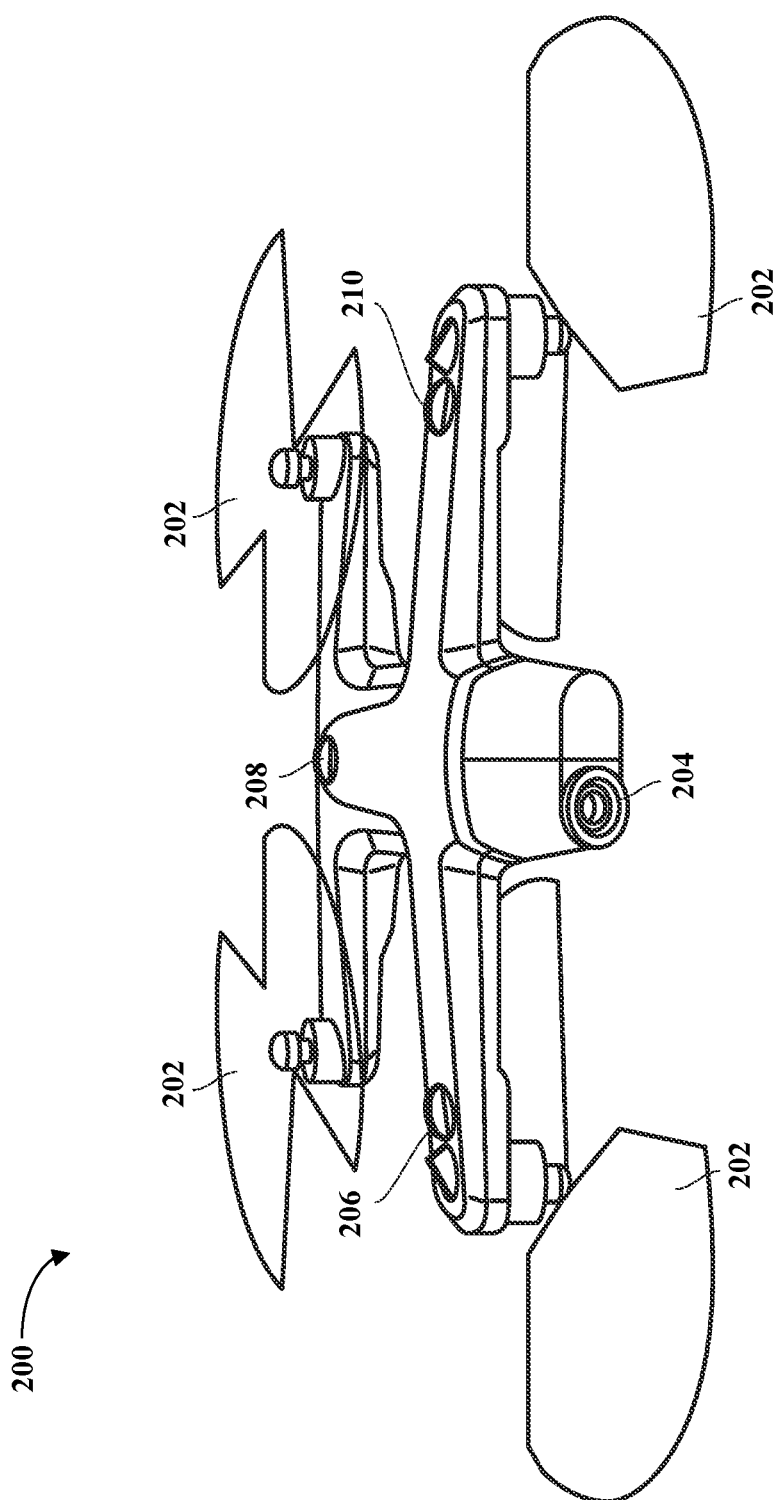
FIG. 2A is an illustration of an example of a UAV as seen from above.
Figure 2B:
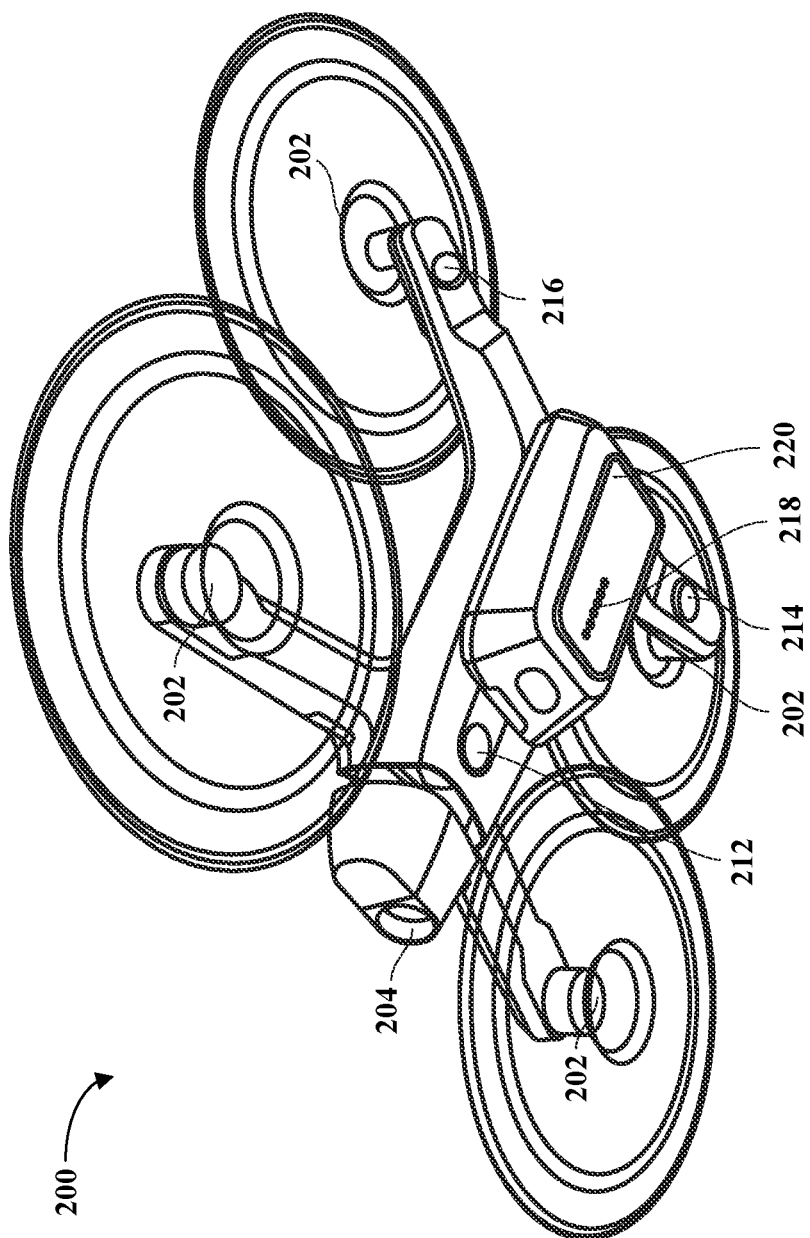
FIG. 2B is an illustration of an example of a UAV as seen from below.

An example illustration of a UAV 200, which may, for example, be the UAV 102 shown in FIG. 1, is shown in FIGS. 2A and 2B. FIG. 2A is an illustration of an example of the UAV 200 as seen from above. The UAV 200 includes a propulsion mechanism 202 including some number of propellers (e.g., four) and motors configured to spin the propellers. For example, the UAV 200 may be a quad-copter drone. The UAV 200 includes image sensors, including a high-resolution image sensor 204. This image sensor 204 may, for example, be mounted on a gimbal to support steady, low-blur image capture and object tracking. The UAV 200 also includes image sensors 206, 208, and 210 that are spaced out around the top of the UAV 200 and covered by respective fisheye lenses to provide a wide field of view and support stereoscopic computer vision. The image sensors 206, 208, and 210 generally have a resolution which is lower than a resolution of the image sensor 204. The UAV 200 also includes other internal hardware, for example, a processing apparatus (not shown). In some implementations, the processing apparatus is configured to automatically fold the propellers when entering a dock (e.g., the dock 106 shown FIG. 1), which may allow the dock to have a smaller footprint than the area swept out by the propellers of the propulsion mechanism 202.

FIG. 2B is an illustration of an example of the UAV 200 as seen from below. From this perspective, three more image sensors 212, 214, and 216 arranged on the bottom of the UAV 200 may be seen. These image sensors 212, 214, and 216 may also be covered by respective fisheye lenses to provide a generally wide field of view and support stereoscopic computer vision. The various image sensors of the UAV 200 may enable visual inertial odometry (VIO) for high resolution localization and obstacle detection and avoidance. For example, the image sensors may be used to capture images including infrared data which may be processed for day or night mode navigation of the UAV 200. The UAV 200 also includes a battery in battery pack 220 attached on the bottom of the UAV 200, with conducting contacts 218 to enable battery charging. The bottom surface of the battery pack 220 may be a bottom surface of the UAV 200.

Figure 3:
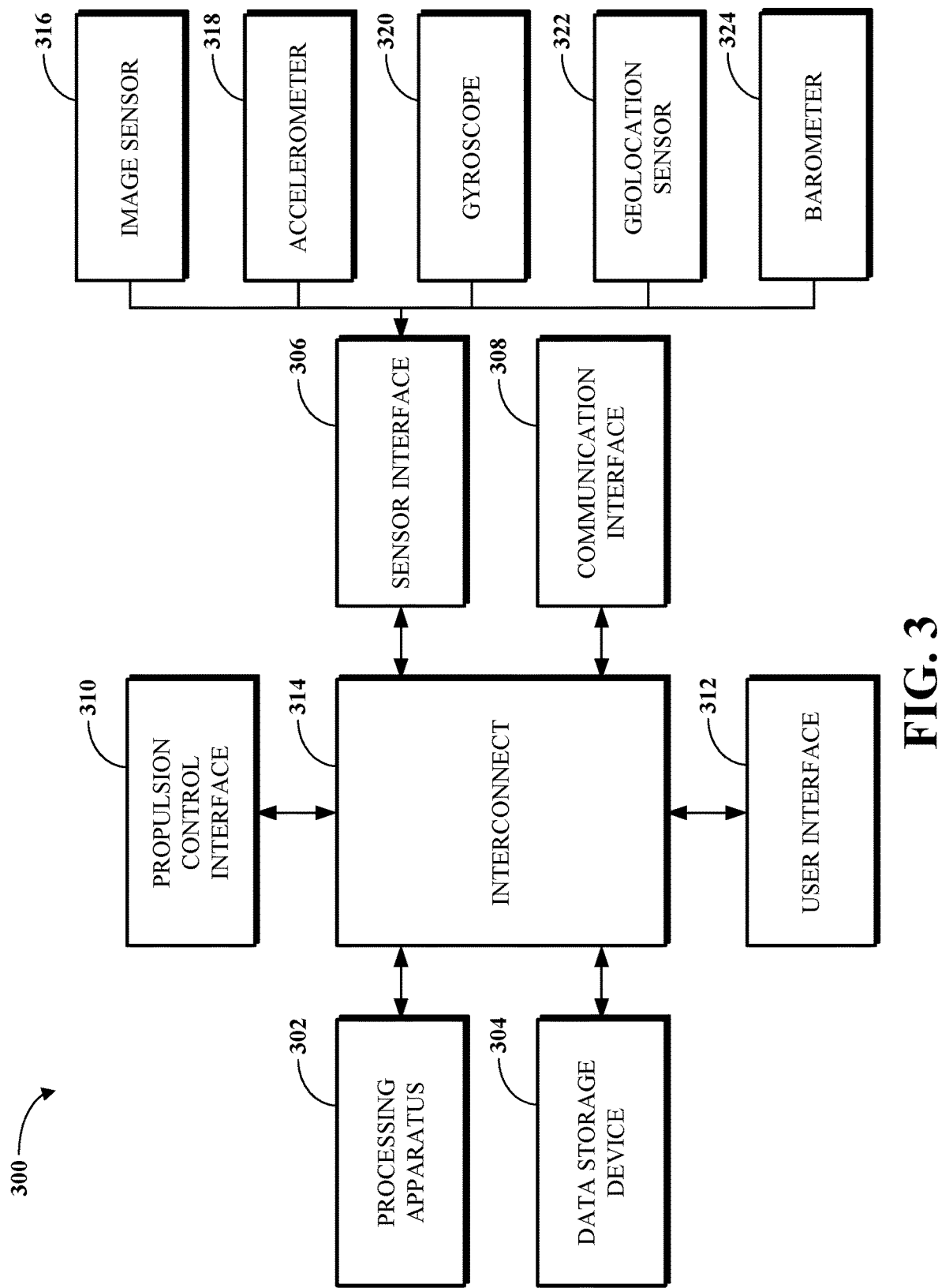
FIG. 3 is a block diagram of an example of a hardware configuration of a UAV.

FIG. 3 is a block diagram of an example of a hardware configuration of a UAV 300, which may, for example, be the UAV 102 shown in FIG. 1. The UAV 300 includes a processing apparatus 302, a data storage device 304, a sensor interface 306, a communications interface 308, propulsion control interface 310, a user interface 312, and an interconnect 314 through which the processing apparatus 302 may access the other components.

The processing apparatus 302 is operable to execute instructions that have been stored in the data storage device 304 or elsewhere. The processing apparatus 302 is a processor with random access memory (RAM) for temporarily storing instructions read from the data storage device 304 or elsewhere while the instructions are being executed. The processing apparatus 302 may include a single processor or multiple processors each having single or multiple processing cores. Alternatively, the processing apparatus 302 may include another type of device, or multiple devices, capable of manipulating or processing data. The processing apparatus 302 may be arranged into processing unit, such as a central processing unit (CPU) or a graphics processing unit (GPU).

The data storage device 304 is a non-volatile information storage device, for example, a solid-state drive, a read-only memory device (ROM), an optical disc, a magnetic disc, or another suitable type of storage device such as a non-transitory computer readable memory. The data storage device 304 may include another type of device, or multiple devices, capable of storing data for retrieval or processing by the processing apparatus 302. The processing apparatus 302 may access and manipulate data stored in the data storage device 304 via the interconnect 314, which may, for example, be a bus or a wired or wireless network (e.g., a vehicle area network).

The sensor interface 306 is configured to control and/or receive data from one or more sensors of the UAV 300. The data may refer, for example, to one or more of temperature measurements, pressure measurements, a global positioning system (GPS) data, acceleration measurements, angular rate measurements, magnetic flux measurements, a visible spectrum image, an infrared image, an image including infrared data and visible spectrum data, and/or other sensor output. For example, the one or more sensors from which the data is generated may include single or multiple of one or more of an image sensor 316, an accelerometer 318, a gyroscope 320, a geolocation sensor 322, a barometer 324, and/or another sensor. In some implementations, the accelerometer 318 and the gyroscope 320 may be combined as an inertial measurement unit (IMU). In some implementations, the sensor interface 306 may implement a serial port protocol (e.g., I2C or SPI) for communications with one or more sensor devices over conductors. In some implementations, the sensor interface 306 may include a wireless interface for communicating with one or more sensor groups via low-power, short-range communications techniques (e.g., using a vehicle area network protocol).

The communications interface 308 facilitates communication with one or more other devices, for example, a paired dock (e.g., the dock 106), a controller (e.g., the controller 104), or another device, for example, a user computing device (e.g., a smartphone, tablet, or other device). The communications interface 308 may include a wireless interface and/or a wired interface. For example, the wireless interface may facilitate communication via a Wi-Fi network, a Bluetooth link, a ZigBee link, or another network or link. In another example, the wired interface may facilitate communication via a serial port (e.g., RS-232 or USB). The communications interface 308 further facilitates communication via a network, which may, for example, be the Internet, a local area network, a wide area network, or another public or private network.

The propulsion control interface 310 is used by the processing apparatus to control a propulsion system of the UAV 300 (e.g., including one or more propellers driven by electric motors). For example, the propulsion control interface 310 may include circuitry for converting digital control signals from the processing apparatus 302 to analog control signals for actuators (e.g., electric motors driving respective propellers). In some implementations, the propulsion control interface 310 may implement a serial port protocol (e.g., I2C or SPI) for communications with the processing apparatus 302. In some implementations, the propulsion control interface 310 may include a wireless interface for communicating with one or more motors via low-power, short-range communications (e.g., a vehicle area network protocol).

The user interface 312 allows input and output of information from/to a user. In some implementations, the user interface 312 can include a display, which can be a liquid crystal display (LCD), a light emitting diode (LED) display (e.g., an OLED display), or another suitable display. In some such implementations, the user interface 312 may be or include a touchscreen. In some implementations, the user interface 312 may include one or more buttons. In some implementations, the user interface 312 may include a positional input device, such as a touchpad, touchscreen, or the like, or another suitable human or machine interface device.

In some implementations, the UAV 300 may include one or more additional components not shown in FIG. 3. In some implementations, one or more components shown in FIG. 3 may be omitted from the UAV 300, for example, the user interface 312.

Figure 4:
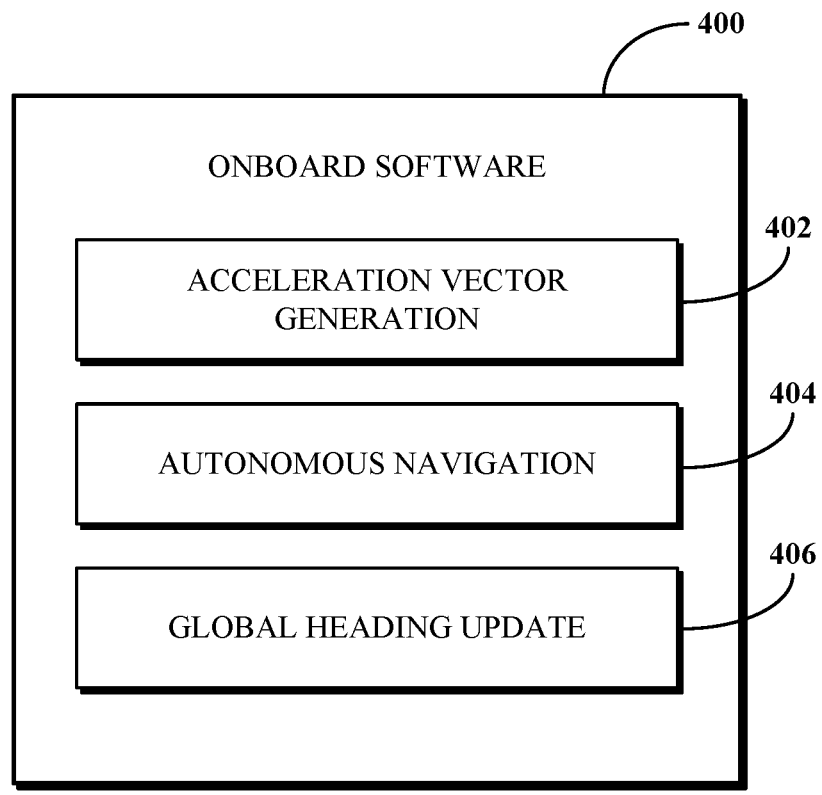
FIG. 4 is a block diagram of example software functionality of a UAV system.

FIG. 4 is a block diagram of example software functionality of a UAV system, which may, for example, be the system 100 shown in FIG. 1. In particular, the software functionality is represented as onboard software 400 running at a UAV, for example, the UAV 102 shown in FIG. 1. The onboard software 400 includes an acceleration vector generation tool 402, an autonomous navigation tool 404, and a global heading update tool 406.

The acceleration vector generation tool 402 configures the UAV for motion-based calibration. The acceleration vector generation tool 402 configures the UAV to obtain acceleration signals from one or more accelerometers and obtain angular rate signals from one or more gyroscopes. The acceleration vector generation tool 402 configures the UAV to fuse the one or more accelerometers and one or more gyroscopes in a complementary filter. The acceleration vector generation tool 402 configures the complementary filter to obtain and combine the acceleration signals and angular rate signals into a combined signal for output.

The acceleration vector generation tool 402 configures the UAV to estimate an orientation of the UAV body. The estimation of the orientation of the UAV body may be based on the combined signals output from the complementary filter. The acceleration vector generation tool 402 configures the UAV to compute a first acceleration vector in a navigation frame of reference, for example, based on the estimated orientation of the UAV body. The acceleration vector generation tool 402 configures the UAV to determine the global velocity from the GPS signal. The acceleration vector generation tool 402 configures the UAV to compute a second acceleration vector in the GPS frame of reference.

The autonomous navigation tool 404 includes functionality for enabling autonomous flight of the UAV. Autonomous flight functionality of the UAV generally includes switching between the use of cameras for vision-based navigation and the use of a GPS and an IMU onboard the UAV for position-based navigation. In particular, autonomous flight of the UAV may use position-based navigation where objects within an environment in which the UAV is operating are determined to be at least some distance away from the UAV, and autonomous flight of the UAV may instead use vision-based navigation where those objects are determined to be less than that distance away from the UAV.

With position-based navigation, the UAV may receive a series of location signals through a GPS receiver. The received GPS signals may be indicative of locations of the UAV within a world frame of reference. The UAV may use the location signals from the GPS receiver to determine a location and velocity of the UAV. The UAV may determine an acceleration signal and an orientation signal within a navigation frame of reference based on acceleration signals from one or more accelerometers and angular rate signals from one or more gyroscopes, such as which may be associated with the IMU onboard the UAV.

With vision-based navigation, one or more onboard cameras of the UAV may continuously or otherwise periodically collect data usable to generate images. The image may be processed in real-time or substantially in real-time to identify objects within the environment in which the UAV is operated and to determine a relative position of the UAV with respect to those objects. Depth estimation may be performed to determine the relative position of the UAV with respect to an object. Performing depth estimation includes modeling depth values for various pixels of the images generated based on the data collected using the onboard cameras. A depth value may, for example, be modeled according to RGB inputs collected for a subject pixel. Based on those depth values and output from the onboard IMU, the trajectory of the UAV toward a detected object may be evaluated to enable the UAV to avoid object collision.

The global heading update tool 406 includes functionality related to the estimating and updating of the UAV heading in a GPS frame of reference (e.g., based on latitude, longitude, and attitude of the UAV). The global heading update tool 406 configures the UAV to estimate the UAV heading by running a histogram filter. The histogram filter may be run recursively by aligning the first acceleration vector and the second acceleration vector. The global heading update tool 406 may configure the histogram filter to provide an uncertainty value to determine whether the motion-based calibration procedure has completed.

The global heading update tool 406 configures the UAV to obtain a time window of acceleration from the first acceleration vector and the second acceleration vector. The global heading update tool 406 configures the UAV to perform a batch optimization, for example, to refine the UAV heading estimate. The global heading update tool 406 may configure the UAV to account for a time delay between the IMU and GPS signals to improve the UAV heading estimate. The global heading update tool 406 configures the UAV to update the UAV heading estimate and calibrate the UAV based on the UAV heading estimate.

Figure 5:
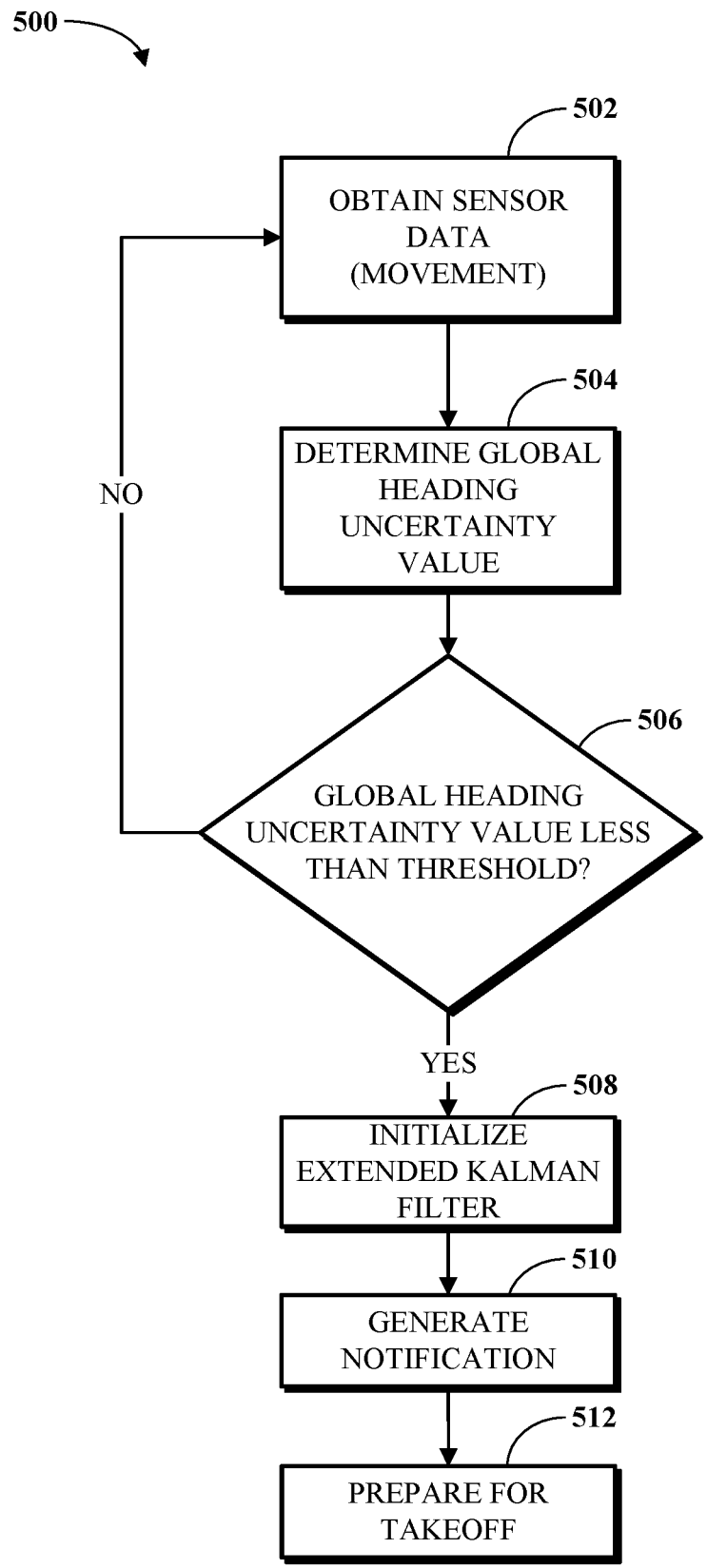
FIG. 5 is a flowchart of an example of a motion-based calibration method for a UAV.

FIG. 5 is a flowchart of an example of a motion-based calibration method 500 for a UAV. At 502, the motion-based calibration method includes obtaining sensor data. Sensor data is obtained when the user performs a manual motion or movement with the UAV. For example, the manual motion or movement may be a lateral hand wave motion (e.g., sweeping back-and-forth horizontally) with the UAV in hand. The obtained sensor data may include gyroscope sensor data, accelerometer sensor data, and GPS sensor data. In some examples, additional sensor data may be obtained, such as magnetometer sensor data, barometer sensor data, or both.

At 504, the motion-based calibration method 500 includes determining a global heading uncertainty value. The global heading uncertainty value is a value of confidence (or lack thereof) in the estimated heading of the UAV. The global heading uncertainty value may be based on an uncertainty of measured angles of azimuth. The uncertainty of the measured angles of azimuth may be based on mean and standard deviation calculations for the measured angles of azimuth. The measured angles of azimuth may range from −180 degrees to +180 degrees. The measured angles of azimuth are calculated based on the sensor data obtained at operation 502. The global heading uncertainty value is determined continuously. In some implementations, the global heading uncertainty value may be determined continually or periodically.

At 506, the motion-based calibration method 500 includes determining whether the global heading uncertainty value is less than a threshold value. The global heading uncertainty value is a statistical value of confidence of the estimated global heading (e.g., a UAV heading in a GPS frame of reference that is based on latitude, longitude, and attitude of the UAV). For example, the sensor data may be continually obtained (at 502) and a global heading uncertainty value continually determined (at 504) until the global heading uncertainty value is less than a threshold value. For example, the threshold value may be a measured angle of azimuth that is 15 degrees or less.

At 508, the motion-based calibration method 500 includes initializing a filter, such as an extended Kalman filter. The filter is initialized to perform state estimation for the UAV during navigation. The filter may perform the state estimation based on accelerometer sensor data, gyroscope sensor data, GPS sensor data, barometer sensor data, or any combination thereof. The state estimation is based on the estimated global heading and may include UAV position, UAV velocity, and UAV orientation to enable control the UAV, for example, in a dark (e.g., low light) environment, such as at nighttime where visual sensors are ineffective.

At 510, the motion-based calibration method 500 includes generating a notification. The notification may be a visual notification, an audible notification, a haptic notification, or any combination or variation thereof, that provides an indication to the user that calibration can be performed and manual motion or movement with the UAV can cease. The notification may be generated responsive to determining that the uncertainty value is below (or less than) a threshold value. In an example, the notification may generated and transmitted for display on a screen of a remote device, such as a controller. For example, the notification may include text such as "Calibration Finished," "Stop Waving," or "Set Drone Down For Takeoff." In another example, the notification may be a visual notification, such as illuminating the LEDs on the UAV in a particular color. For example, the notification may include illuminating the LEDs on the UAV in green, or another color. In another example, the notification may be an audible notification. The audible notification may be a sound that is emitted from the UAV, the controller, or both. In yet another example, the notification may be a haptic notification, such as where the haptic notification causes the UAV and/or the controller to vibrate. It is appreciated that the notification can include combinations or variations of the above examples.

At 512, the motion-based calibration method 500 includes preparing for takeoff. Preparing for takeoff includes calibrating the UAV based on the global heading value determined to have an uncertainty value less than the threshold value. Additionally, preparing for takeoff may include determining that the UAV is on a level and steady surface (e.g., solid ground for a ground based launch or a steady hand for a handheld launch) based on the state estimation and performing various pre-flight checks. The determination that the UAV is on the steady surface may be based on sensor data, for example image sensor data, GPS data, accelerometer data, gyroscope data, or any combination thereof.

Figure 6:
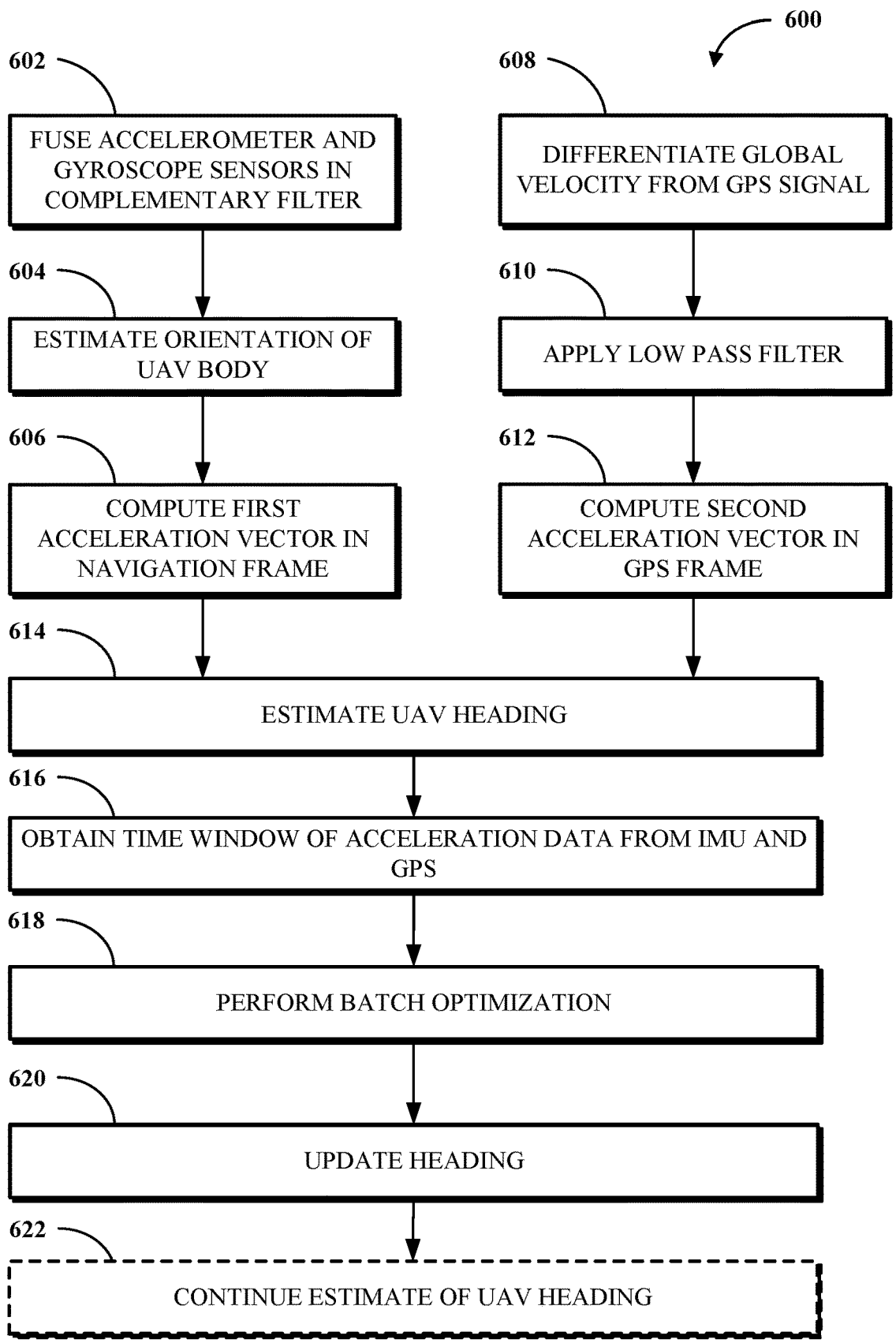
FIG. 6 is a flowchart of an example of a method for estimating a heading of a UAV.

FIG. 6 is a flowchart of an example of a method 600 for estimating a heading of a UAV. At 602, the method 600 includes fusing accelerometer and gyroscope sensors in a complementary filter. The complementary filter is a sensor fusion technique that includes a low-pass filter and a high-pass filter. In an inertial-sensor-based attitude estimation, the dynamic motion characteristics of the gyroscope sensor are complementary to that of the accelerometer sensor. The complementary filter is configured to obtain acceleration signals from one or more accelerometers during a lateral hand wave motion and combine them with obtained angular rate signals from one or more gyroscopes. The complementary filter is configured to output the acceleration signals and the angular rate signals as a combined signal. The combined signal may be an average of the acceleration signals and the angular rate signals. The combined signal may be tuned by assigning weights to the acceleration signals and the angular rate signals. In some examples, the combined signal may be tuned based on other factors, such as barometer values.

At 604, the method 600 includes estimating an orientation of the UAV body. The estimation of the orientation of the UAV body may be based on the combined signals that are output from the complementary filter. The estimation of the orientation of the UAV body may be performed by measuring a gravity vector and ignoring other vectors, such as external acceleration vectors based on the acceleration signals and the angular rate signals.

At 606, the method 600 includes computing a first acceleration vector in a navigation frame of reference. The navigation frame of reference is a local frame of reference when the UAV is powered on and is based on acceleration data from the accelerometer and gyroscope sensors. In the navigation frame of reference, the UAV is aligned with the gravity vector and GPS data can be ignored. The first acceleration vector may be computed based on the estimated orientation of the UAV body. The first acceleration vector is associated with the IMU and may be referred to as the IMU vector.

At 608, the method 600 includes differentiating the velocity from the GPS signal in the GPS frame of reference. Differentiating the velocity may include calculating the velocity of the UAV based on the GPS signals obtained during the lateral hand wave motion.

At 610, the method 600 includes applying a low pass filter to the velocity. At 612, the method 600 includes computing a second acceleration vector in the GPS frame of reference. The second acceleration vector may be computed based on the output of the low pass filter. The low pass filter is configured to smooth the data to remove noise. The second acceleration vector is associated with the GPS and may be referred to as the GPS vector.

At 614, the method 600 includes estimating the UAV heading. The UAV heading may be estimated by running a histogram filter recursively by aligning the first acceleration vector and the second acceleration vector. In an example, a horizontal portion of the first acceleration vector may be aligned with a horizontal portion of the second acceleration vector. In this example, the first and second acceleration vectors are in three dimensions and have X, Y, and Z values. To compute the UAV heading, two dimensions may be used (e.g., X and Y values). In this example, the UAV heading may be computed as follows: Vector1(x1, y, 1, z1) and Vector2 (x2, y2, z2)→yaw1=a tan 2(y1, x1); yaw2=a tan 2(y2, x2)→heading=yaw1−yaw2. In this example, the Z values are essentially ignored when computing the UAV heading.

The histogram filter is configured to converge the estimated UAV headings between the navigation frame of reference and the GPS frame of reference. The histogram filter may be configured to provide an uncertainty value of the estimated UAV heading angle to determine whether the procedure has completed. For example, the procedure may be determined to be completed when the uncertainty value falls below a threshold value, for example, 15 degrees. The UAV heading estimation may be performed continuously.

At 616, the method 600 includes obtaining a time window of acceleration from the IMU and GPS vectors computed at operations 606 and 612, respectively. The time window may include the last 5 or 10 seconds of obtained data. At 618, the motion-based calibration method 600 includes performing a batch optimization. The batch optimization operation may be performed on the obtained data of the time window to refine the UAV heading given an initial UAV heading computed at operation 614. The batch optimization operation may improve the UAV heading estimate by accounting for a time delay between the IMU and GPS signals. The batch optimization operation may include using a set of acceleration data collected during the motion-based calibration and processing the set of acceleration data using a least mean squares algorithm, such as a Levenberg-Marquardt algorithm, to optimize the heading estimate given the estimated value from the histogram filter as an initial value.

At 620, the method 600 includes updating the UAV heading. Updating the UAV heading may include resetting the estimated heading between the navigation frame of reference and the GPS frame of reference to zero. The UAV heading may be updated based on the output of the batch optimization operation. Updating the UAV heading may include storing the updated heading, for example, on a memory of the UAV, a memory of the controller, or both. The updated UAV heading may be used to calibrate the UAV for flight. In some examples, the batch operation to refine the UAV heading may continue during flight operation of the UAV. Updating the UAV heading may include initializing the UAV for flight.

At 622, the method 600 may include continuing estimating the UAV heading. The UAV heading may be estimated by running a histogram filter recursively by aligning the first acceleration vector and the second acceleration vector. The histogram filter may be configured to provide an uncertainty value of the estimated UAV heading angle to determine whether the procedure has completed. For example, the procedure may be determined to be completed when the uncertainty value falls below a threshold value, for example, 15 degrees. The UAV heading estimation may be performed continuously, for example, during flight.

Figure 7A:
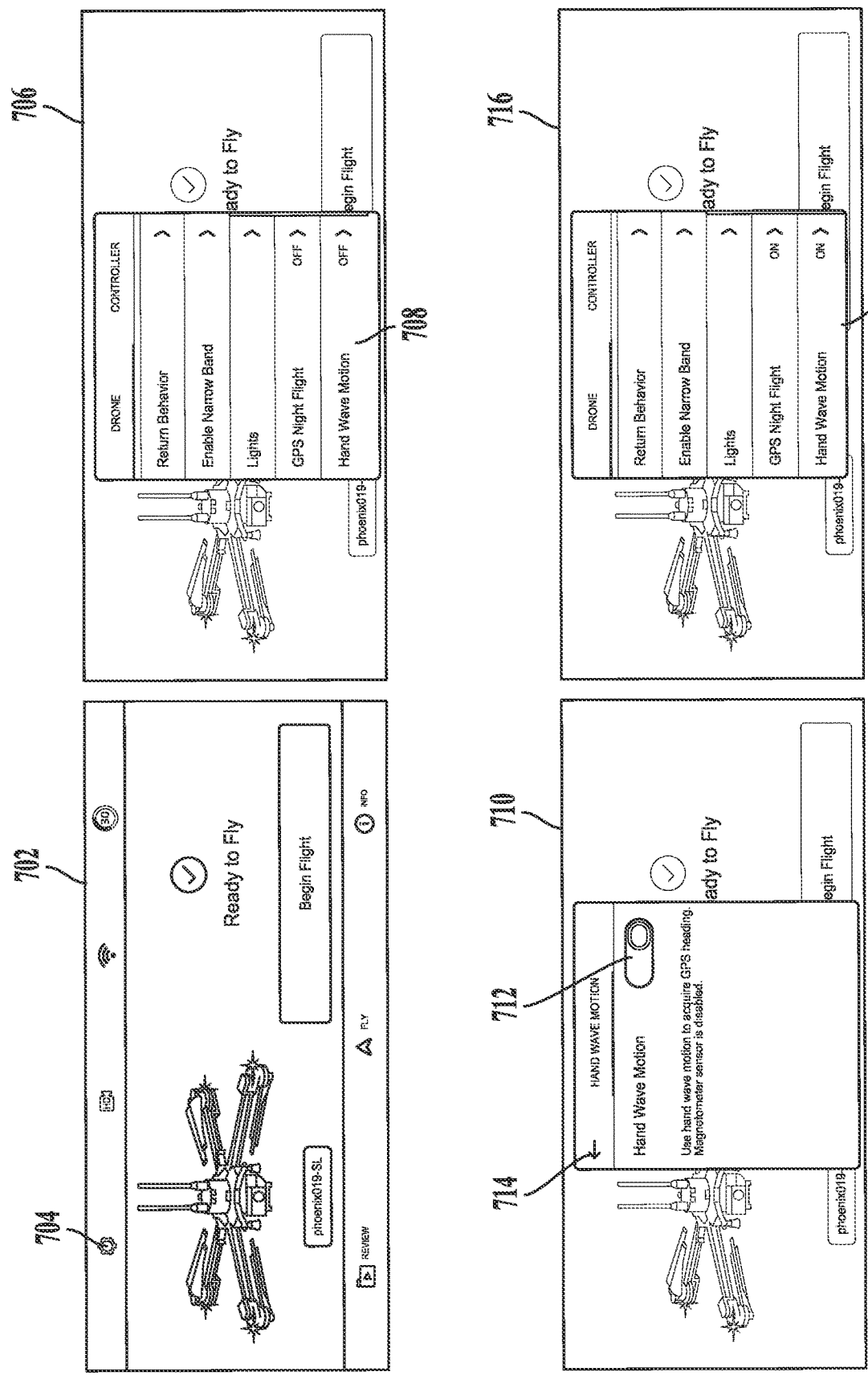
FIGS. 7A-7C are illustrations of example graphical user interface (GUI) displays for entering motion-based calibration mode.
Figure 7B:
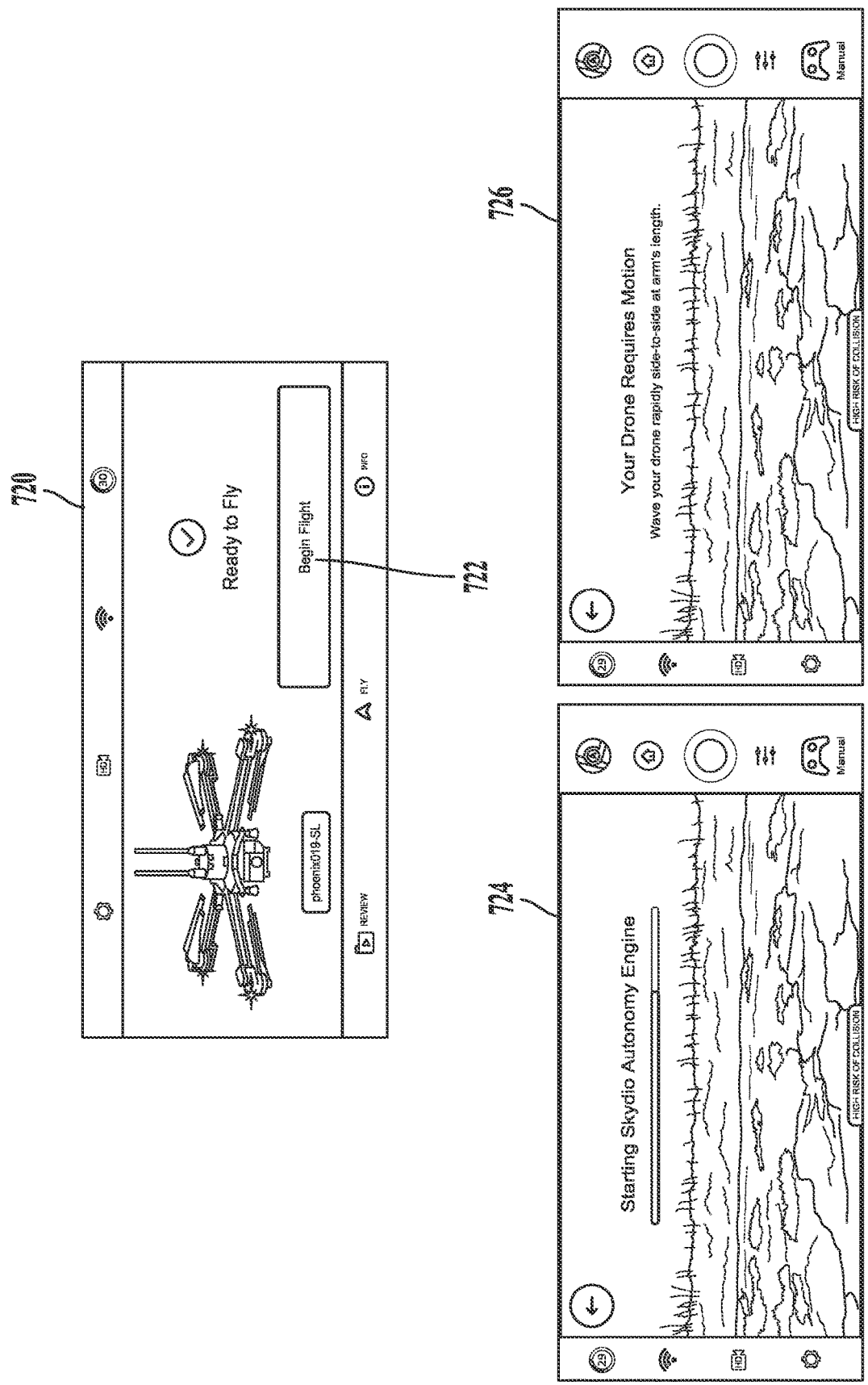
Figure 7C:
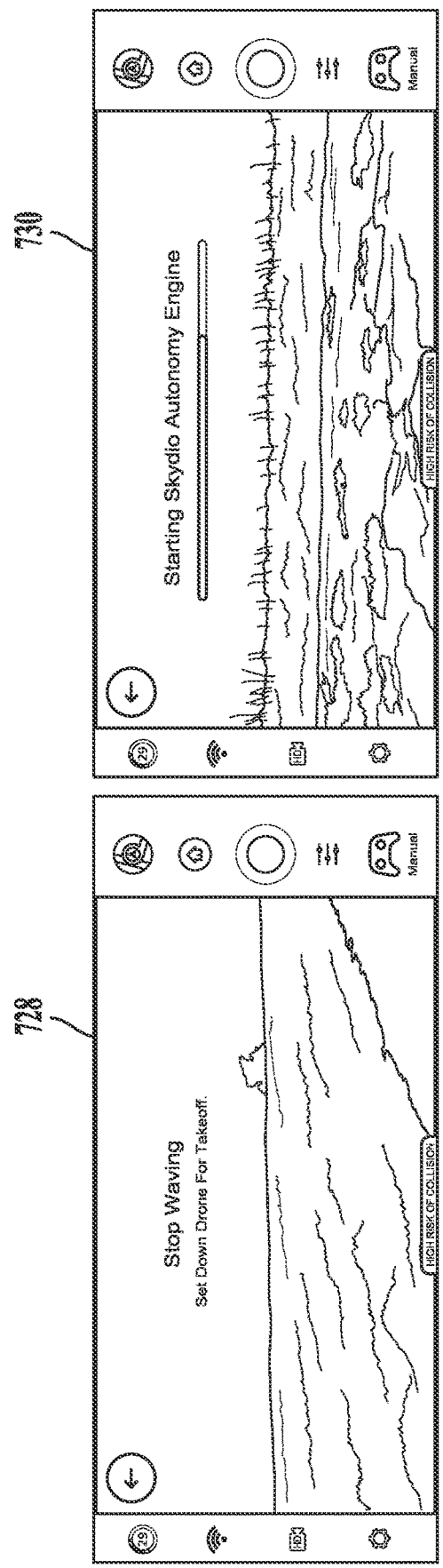

FIGS. 7A-7C are illustrations of example graphical user interface (GUI) displays for entering motion-based calibration mode. As shown in FIG. 7A the GUI display 702 is an example of a main screen that includes a settings icon 704.

When the settings icon 704 is activated, such as by a press on a touch display, GUI display 706 is presented to the user. The GUI display 706 includes a number of settings that the user can enable, disable, or modify. In this example, the Hand Wave Motion setting 708 is set to "OFF." In order to activate motion-based calibration, the user may select the Hand Wave Motion setting 708, which causes the controller to display GUI display 710.

The GUI display 710 includes a toggle switch 712. The user may activate hand calibration by sliding the toggle switch 712 to the "ON" position, as shown in FIG. 7A. After sliding the toggle switch 712 to the "ON" position, the user may select the back button 714 to return to the previous GUI display, which is shown as GUI display 716. As shown on GUI display 716, the motion-based calibration is activated as indicated by the Hand Wave Motion setting 718 is set to "ON."

Once the motion-based calibration is activated, the user may return to the main screen as shown in GUI display 720 in FIG. 7B. At this point, the UAV is ready to fly. When the user selects the Begin Flight button 722, the autonomy engine may be initiated, as shown in GUI 724. Once the autonomy engine has loaded, the system may determine that a motion-based calibration is needed as shown in GUI display 726. The GUI display 726 includes instructions for the user to perform, such as "Wave your drone rapidly side-to-side at arm's length," as shown in FIG. 7B. The system is configured to collect data, such as accelerometer data, gyroscope data, GPS data, or any combination thereof, while the user is waving the UAV. When the system determines that sufficient data has been collected, the system may display instructions such as "Stop Waving" and/or "Set Down Drone for Takeoff," as shown in GUI display 728 in FIG. 7C. When the UAV determines that the UAV has been set down, for example using data from one or more sensors, the system may start the autonomy engine in preparation for takeoff as shown in GUI display 730.

Figure 8A:
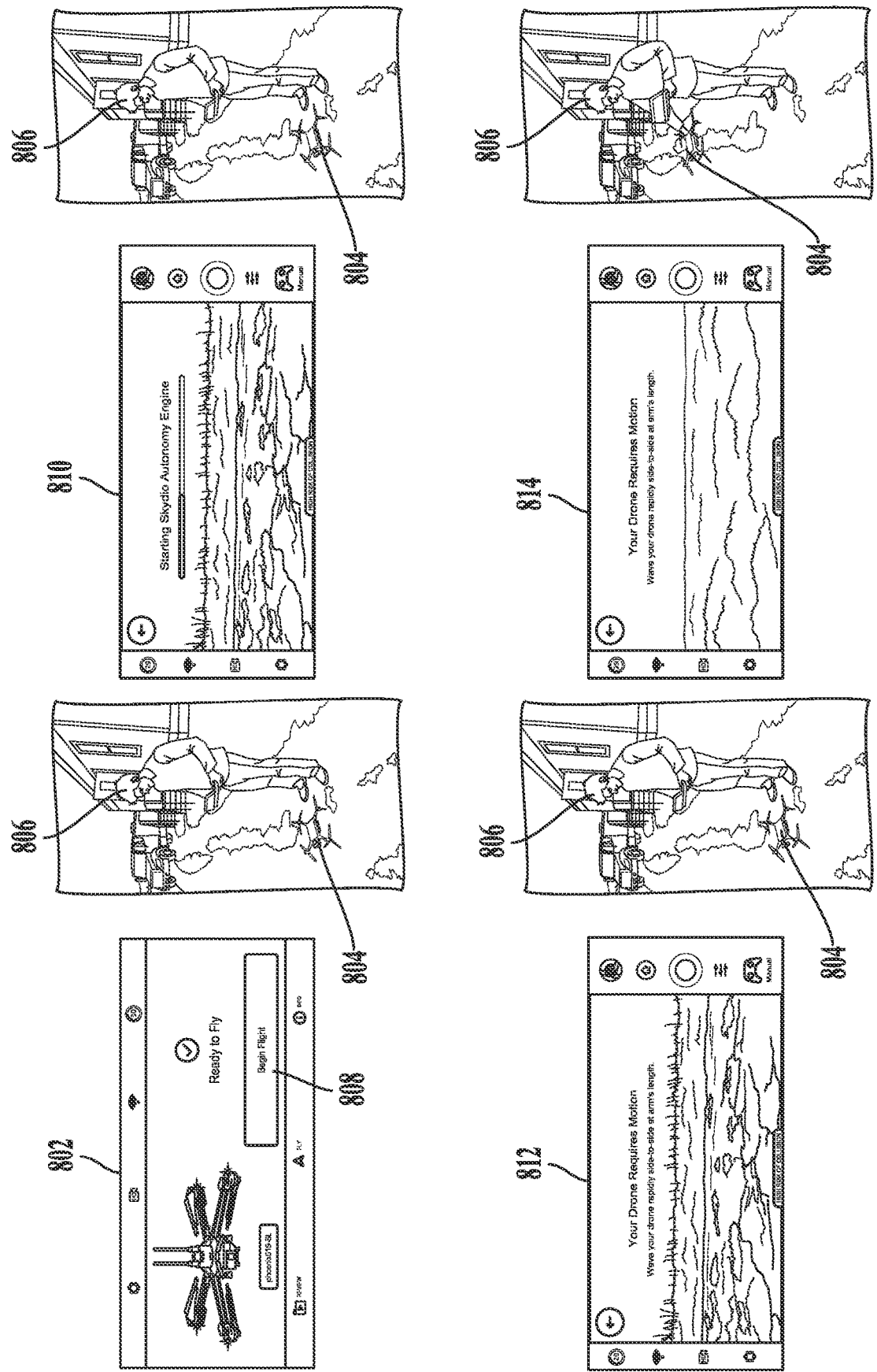
FIGS. 8A-8C are illustrations of example GUI displays with user actions for performing a motion-based calibration.
Figure 8B:
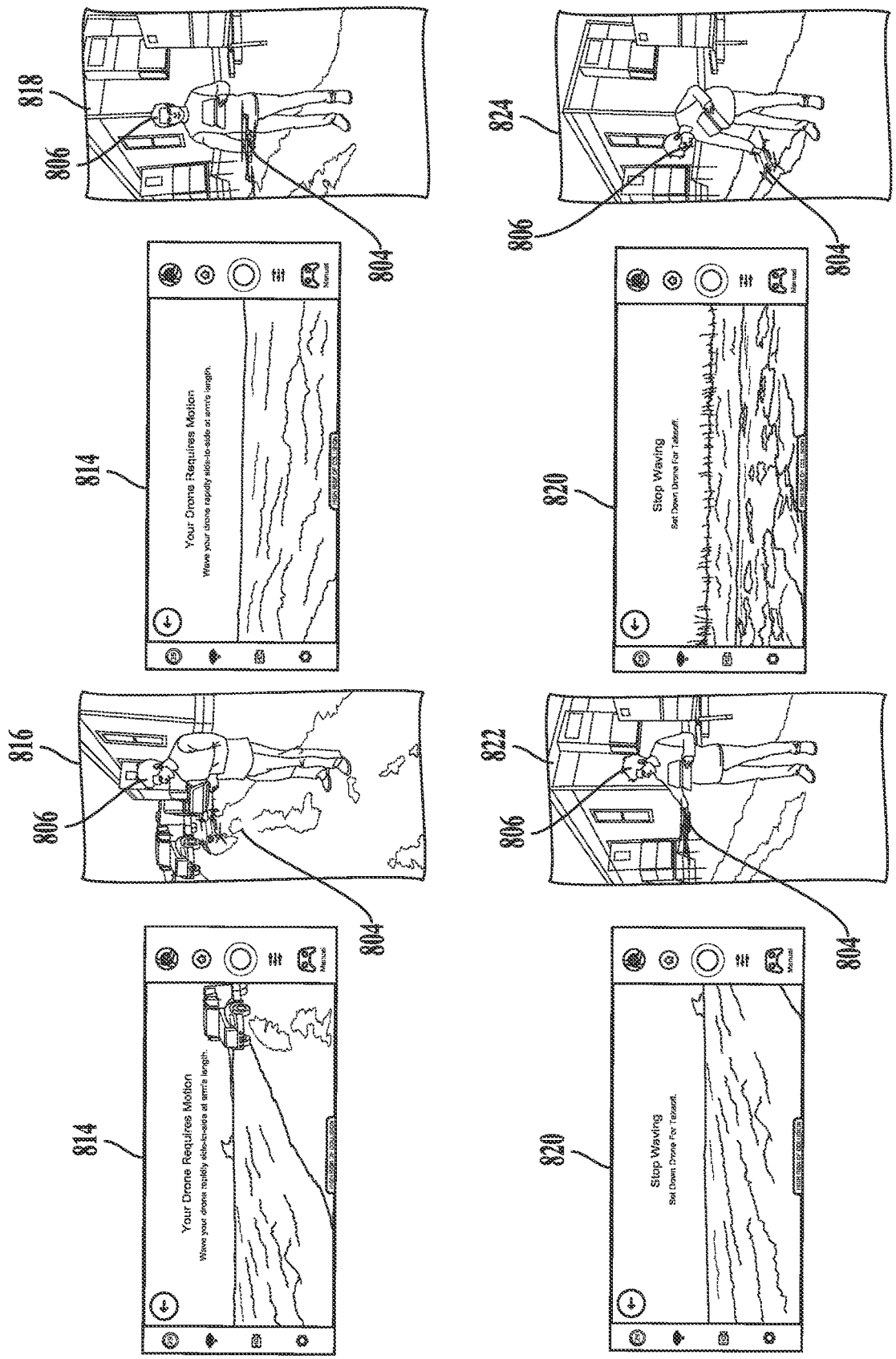
Figure 8C:
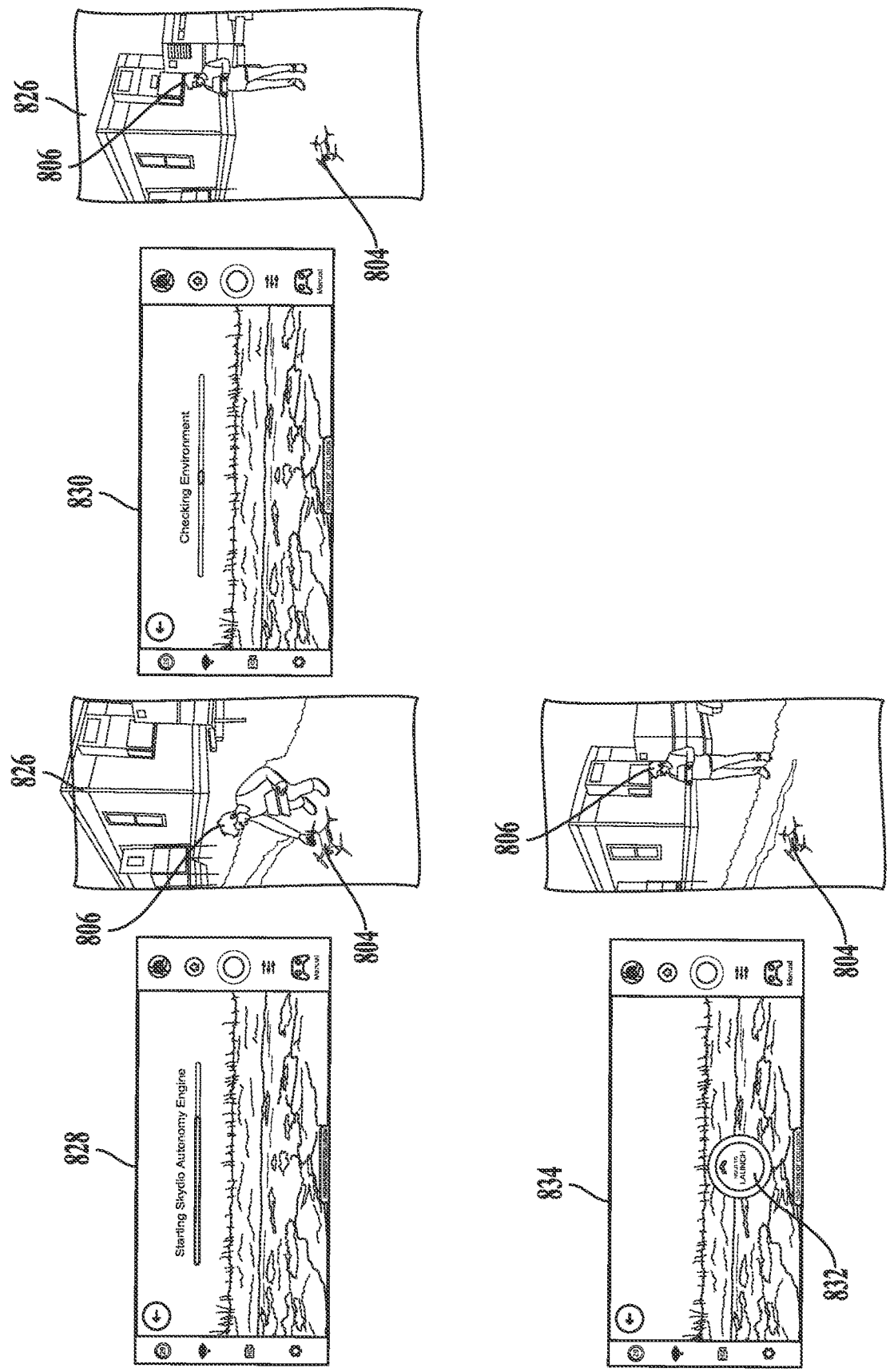

FIGS. 8A-8C are illustrations of example GUI displays with user actions for performing a motion-based calibration. As shown in FIG. 8A, GUI display 802 indicates that the UAV 804 has been placed on the ground by user 806 and is ready to fly. When the user 806 selects the Begin Flight button 808, the autonomy engine may be initiated, as shown in GUI 810. Once the autonomy engine has loaded, the system may determine that a motion-based calibration is needed as shown in GUI display 812. The GUI display 812 includes instructions for the user 806 to perform, such as "Wave your drone rapidly side-to-side at arm's length," as shown in FIG. 8A. As shown in FIG. 8B, the user 806 may pick the UAV 804 up off the ground and wave the UAV from side-to-side as instructed in GUI display 814. As shown in the image 816, the user waves the UAV 804 to the right and then to the left, as shown in image 818. The user 806 continues this wave motion and the system is configured to collect data, such as accelerometer data, gyroscope data, GPS data, or any combination thereof, while the user 806 is waving the UAV 804. When the system determines that sufficient data has been collected, the system may display instructions such as "Stop Waving" and/or "Set Down Drone for Takeoff," as shown in GUI display 820 in FIG. 8B. As shown in image 822, the user 806 stops waving the UAV 804 as instructed. The system will display the GUI display 820 until the user 806 places the UAV 804 on the ground as shown in image 824. When the UAV 804 determines that the UAV 804 has been set down, as shown in image 826, the system may start the autonomy engine in preparation for takeoff as shown in GUI display 828 shown in FIG. 8C.

When the autonomy engine has loaded, the UAV 804 may check the environment as shown in GUI display 830. The UAV 804 may check the environment, for example, for obstacles, to determine whether it is safe to take off. When the UAV 804 determines that it is safe to take off, the system displays a launch button 832 on GUI display 834. In an example, the UAV 804 may take off when the user 806 holds down the launch button 832.

Figure 9:
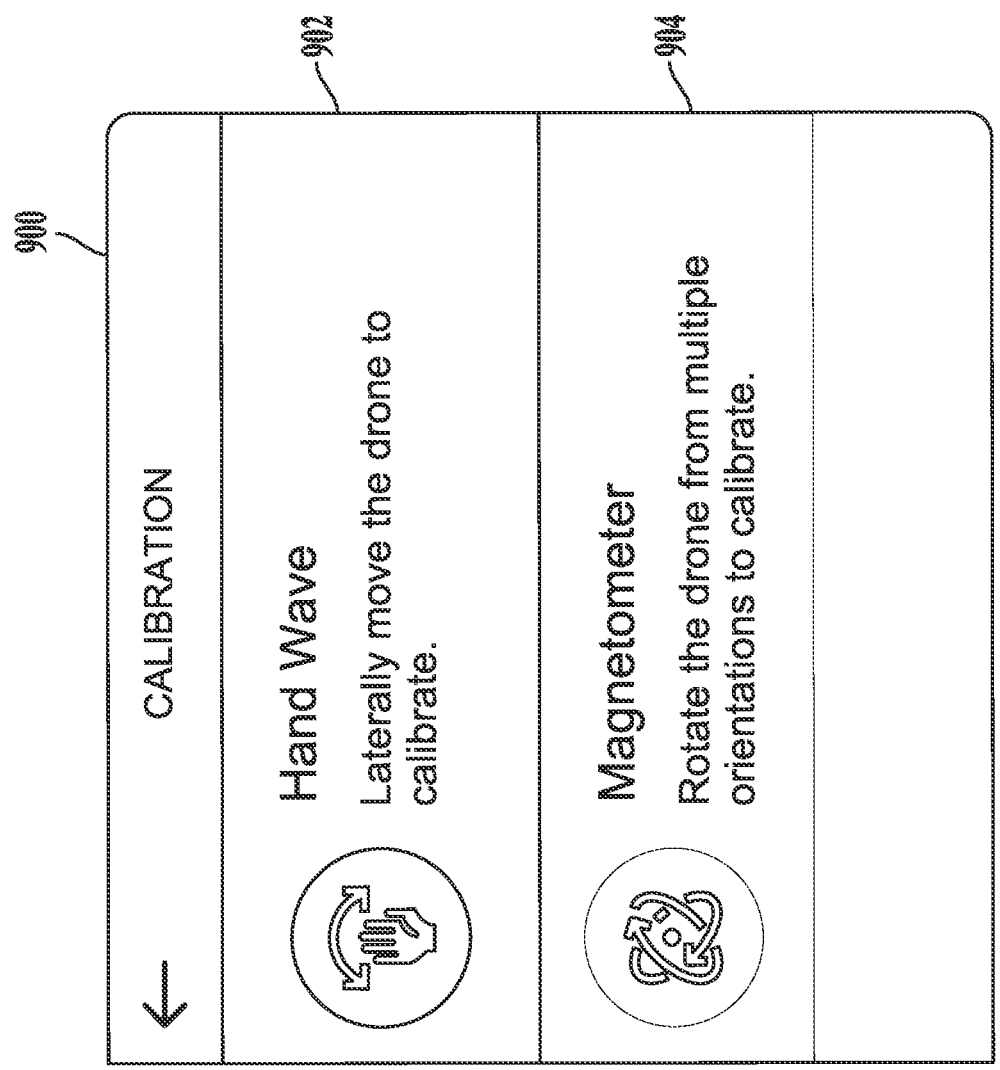
FIG. 9 is an illustration of an example GUI display for calibration mode options.

FIG. 9 is an illustration of an example GUI display 900 for calibration mode options. As shown in FIG. 9, the GUI display 900 may display a hand wave calibration option 902 and a magnetometer calibration option 904. In some implementations, the hand wave calibration may be available as the default GPS Night Flight calibration option. The option to switch between the hand wave calibration option 902 and the magnetometer calibration option 904 can be nested in the GPS Night Flight menu. Changing these options may be persistent across flights and power cycles.

Figure 10:
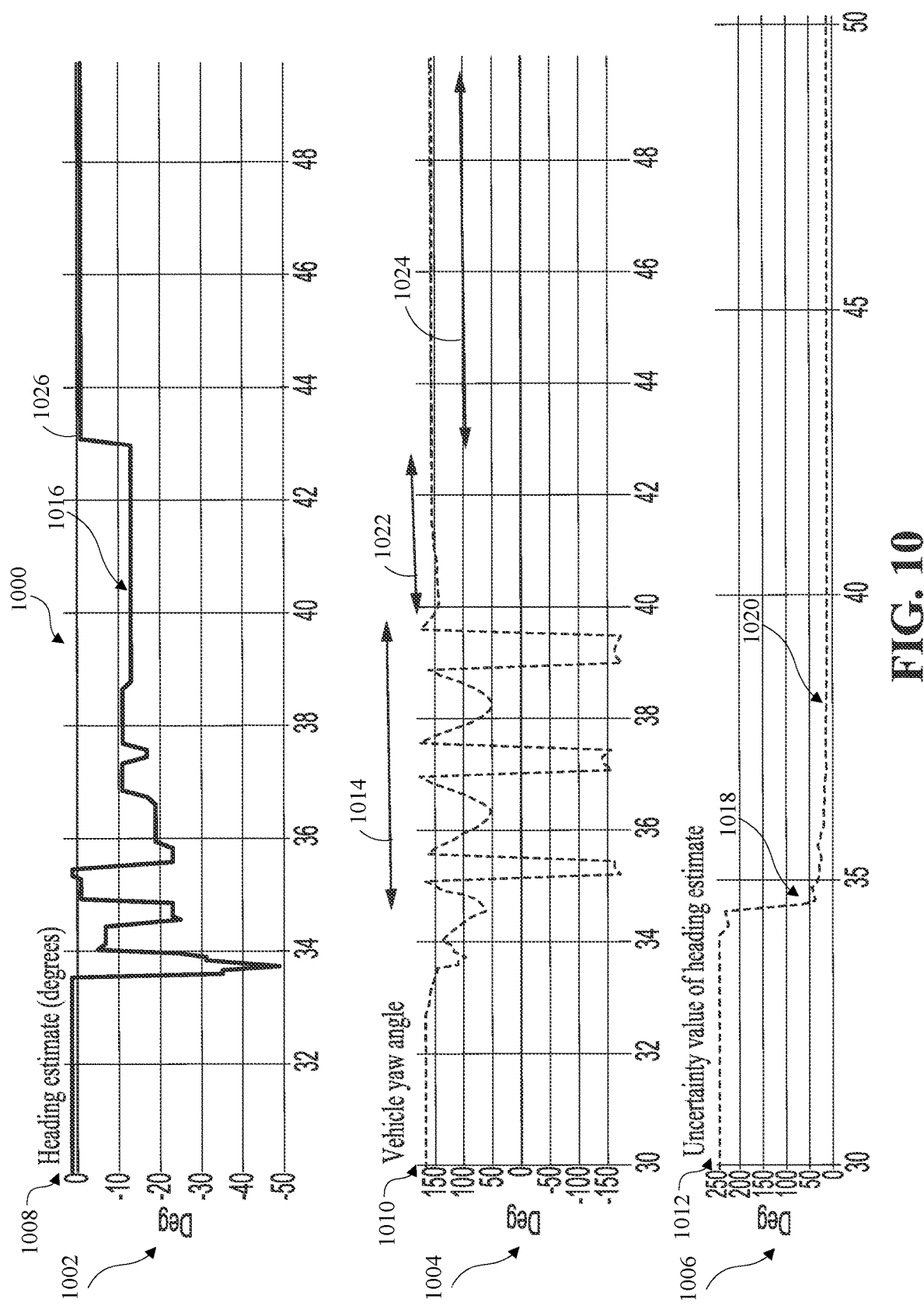
FIG. 10 is an example of a plot comparison of a heading estimate, UAV yaw angle, and uncertainty value of the heading estimate during a motion-based calibration.

FIG. 10 is an example of a plot comparison 1000 of a heading estimate 1002, UAV yaw angle 1004, and uncertainty value 1006 of the heading estimate during a motion-based calibration. The motion-based calibration begins with an initial heading estimate of zero (0) degrees as shown at 1008, an initial UAV yaw angle of +180 degrees as shown at 1010, and an initial uncertainty value of 250 as shown at 1012.

The motion of the UAV during the motion-based calibration is shown as 1014. As shown in 1014, the UAV yaw angle can vary between +180 degrees and −180 degrees during the motion-based calibration. As the motion is performed, the heading estimate is refined as the relative heading between the navigation frame of reference and the GPS frame of reference converge at 1016 and the uncertainty value decreases at 1018. When the uncertainty value is below a threshold value, for example, at 1020, a notification is generated at 1022 to instruct the user to put the UAV down (e.g., on the ground). Upon confirmation that the UAV has been put down, a filter, such as an extended Kalman filter is initialized at 1024, and the relative heading between the navigation frame of reference and the GPS frame of reference is reset to zero (0) at 1026.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices.

Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An unmanned aerial vehicle (UAV) comprising:
   an accelerometer configured to generate acceleration signals;
   a gyroscope configured to generate angular rate signals;
   a global positioning system (GPS) sensor configured to detect GPS signals; and
   a processor configured to:
      continually determine a global heading based on sensor data obtained from at least one of the accelerometer, the gyroscope, or the GPS sensor, wherein the global heading is a heading of the UAV in a GPS frame of reference that is based on latitude, longitude, and attitude of the UAV, and wherein the global heading includes an uncertainty value that is based on a standard deviation of measured angles of azimuth and that is continuously determined with the global heading;
      determine that the uncertainty value is less than a threshold value, wherein the threshold value is a confidence value of the measured angles of azimuth;
      responsive to determining that the uncertainty value is less than the threshold value:
      initialize an extended Kalman filter to perform a state estimation of the UAV based on the sensor data, wherein the state estimation includes a position of the UAV, a velocity of the UAV, and an orientation of the UAV; and
      calibrate at least one of the gyroscope, the accelerometer, or the GPS sensor based on the global heading.

2. The UAV of claim 1, wherein the measured angles of azimuth range from −180 degrees to +180 degrees.

3. The UAV of claim 1, wherein the processor is configured to obtain the acceleration signals from the accelerometer, the angular rate signals from the gyroscope, and the GPS signals from the GPS sensor until the uncertainty value is less than the threshold value.

4. The UAV of claim 1, wherein the threshold value is a measured angle of azimuth that is 15 degrees or less.

5. The UAV of claim 1, wherein the processor is further configured to:
   generate a notification when the uncertainty value is less than the threshold value.

6. The UAV of claim 5, wherein the processor is further configured to:
   transmit the notification to a remote device for causing a visual, audible, or haptic notification via the remote device.

7. The UAV of claim 5, wherein the notification comprises one or more of: a visual notification, an audible notification, and a haptic notification.

8. The UAV of claim 7, wherein the visual notification comprises a text display or a light emitting diode (LED) illumination.

9. A non-transitory computer-readable medium storing instructions which, when executed by an on-board computer of an unmanned aerial vehicle (UAV), causes the on-board computer to:
   obtain acceleration signals from one or more acceleration sensors and angular rate signals from one or more gyroscope sensors;
   fuse the acceleration signals and the angular rate signals in a complementary filter to obtain a combined signal;
   estimate an orientation of the UAV based on the combined signal;
   determine a first acceleration vector in a navigation frame of reference;
   determine a velocity from a global positioning system (GPS) signal;
   determine a second acceleration vector in a GPS frame of reference; and
   estimate a heading for the UAV based on the first acceleration vector and the second acceleration vector.

10. The non-transitory computer-readable medium of claim 9, wherein executing the instructions by the on-board computer of the UAV causes the on-board computer to:
    obtain a time window of acceleration data; and
    perform a batch optimization to refine the estimated heading.

11. The non-transitory computer-readable medium of claim 9, wherein the navigation frame of reference is based on data from the one or more acceleration sensors and the one or more gyroscope sensors.

12. The non-transitory computer-readable medium of claim 9, wherein the combined signal is an average of the acceleration signals and the angular rate signals.

13. The non-transitory computer-readable medium of claim 9, wherein determining the second acceleration vector includes applying a low pass filter.

14. The non-transitory computer-readable medium of claim 9, wherein estimating the heading for the UAV includes recursively running a histogram filter.

15. The non-transitory computer-readable medium of claim 14, wherein the histogram filter provides an uncertainty value.

16. The non-transitory computer-readable medium of claim 9, wherein estimating the heading for the UAV includes aligning the first acceleration vector and the second acceleration vector.

17. A method for use in an unmanned aerial vehicle (UAV), the method comprising:
 obtaining acceleration signals from one or more acceleration sensors and angular rate signals from one or more gyroscope sensors;
 fusing the acceleration signals and the angular rate signals in a complementary filter to obtain a combined signal that is output by the complementary filter;
 estimating an orientation of the UAV based on the combined signal, wherein the combined signal is an average of the acceleration signals and the angular rate signals, and wherein the combined signal is tuned by assigning weights to the acceleration signals and the angular rate signals;
 determining a first acceleration vector in a first frame of reference based on the orientation of the UAV;
 determining a velocity from a global positioning system (GPS) signal;
 determining a second acceleration vector in a second frame of reference; and
 estimating a heading for the UAV based on the first acceleration vector and the second acceleration vector.

18. The method of claim 17, wherein the first frame of reference is a navigation frame of reference, and wherein the second frame of reference is a GPS frame of reference.

19. The method of claim 17, wherein determining the second acceleration vector includes applying a low pass filter.

20. The method of claim 17, further comprising:
 obtaining a time window of acceleration from the first acceleration vector and the second acceleration vector; and
 refining the heading that is estimated based on the time window.

* * * * *